United States Patent [19]

Yoshimoto

[11] Patent Number: 4,701,687
[45] Date of Patent: Oct. 20, 1987

[54] CONTROLLER FOR ENERGIZATION OF A STEPPER MOTOR

[75] Inventor: Satoshi Yoshimoto, Komaki, Japan

[73] Assignee: Brother Kogyo Kabushiki Kaisha, Aichi, Japan

[21] Appl. No.: 888,441

[22] Filed: Jul. 23, 1986

[30] Foreign Application Priority Data

Jul. 30, 1985 [JP] Japan ................................. 60-169004
Sep. 12, 1985 [JP] Japan ................................. 60-202225

[51] Int. Cl.$^4$ ............................................. H02S 8/00
[52] U.S. Cl. ..................................... 318/696; 318/685
[58] Field of Search .................................. 318/696, 685

[56] References Cited

U.S. PATENT DOCUMENTS 4,471,282 9/1984 Moriguchi ........................... 318/696

FOREIGN PATENT DOCUMENTS 8504061 9/1985 United Kingdom .

Primary Examiner—William M. Shoop, Jr.
Assistant Examiner—Saul M. Bergmann
Attorney, Agent, or Firm—Parkhurst & Oliff

[57] ABSTRACT

The present invention provides an N phase/N+1 phase energization type stepper motor controller for alternately energizing an N number and an N+1 number of phases where N is an integer equal to or greater than one. The controller detects which phase(s) is(are) energized at a time when the stepper motor is paused, and sets a starting pulse width for N phase energization to be made shorter than that of N+1 phase energization, in response to the detected results. When the initial energization in starting is N+1 phase, a driving pulse having a width which is longer than that N phase for energization is outputted. The N+1 phase energization has stronger magnetism for rotating a rotor than N phase energization, thereby increasing the rotational speed for starting. When the initial energization is N phase, a driving pulse having a width which is shorter than that for N+1 phase energization is outputted. Thus the magnetism is made stronger so that the starting rotational speed is increased when performing either N+1 phase energization or N phase energization. The period for executing N phase energization is made shorter than that for N+1 phase energization, and the ratio of periods for N phase and N+1 phase energization is kept constant. By shortening the period for N phase energization and extending the period for N+1 phase energization, smooth and constant rotation is obtained.

10 Claims, 16 Drawing Figures 41a 42 44

41b 42 44

41c 42 44

41d 42 44

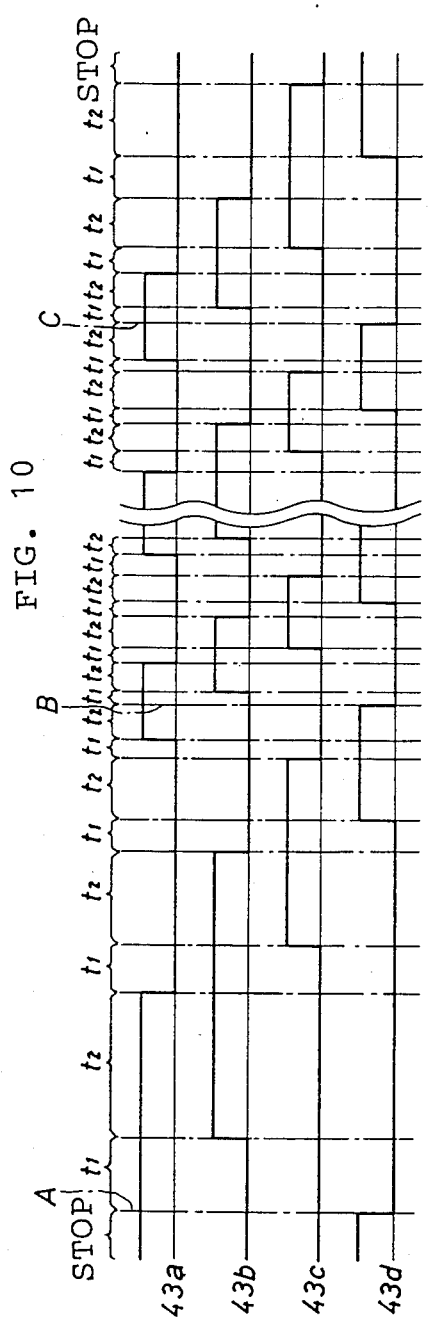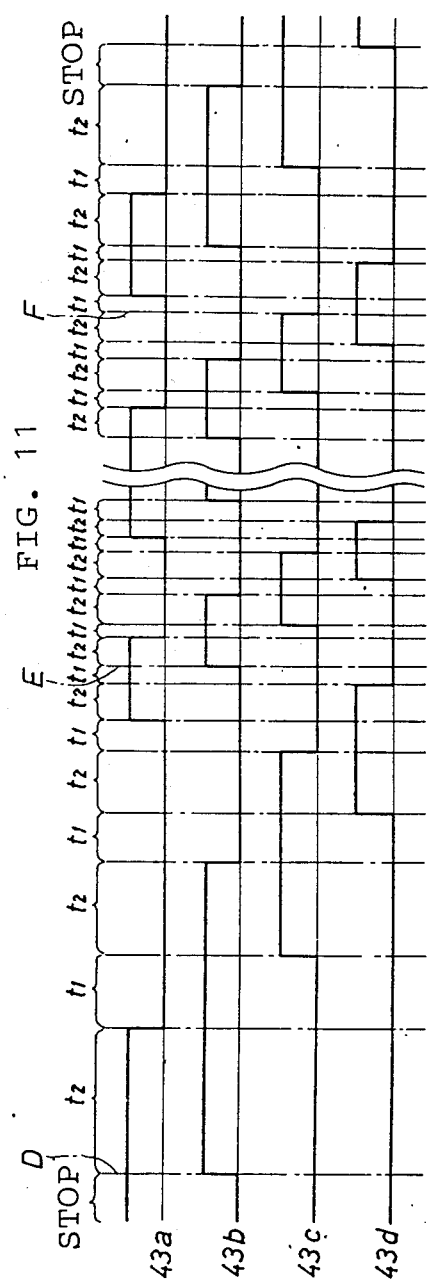

CONTROLLER FOR ENERGIZATION OF A STEPPER MOTOR

BACKGROUND OF THE INVENTION

1. Technical Field

The present invention relates to a controller for a stepper motor of N phase and N+1 phase energization type alternately using both N and N+1 phase energization.

2. Prior Art

Controllers for the stepper motor of N phase and N+1 phase energization type such as one-two phase energization, two-three phase energization or three-four phase energization have been proposed to execute both N and N+1 phase energization via a same pulse width, where N stands for an integer equal to or larger than 1. Thus, the initial pulse width for driving the stepper motor is always the same irrespective of whether N or N+1 phase energization is initially executed. However, since the energization current flowing through the stepper motor is variable depending on N phase and N+1 energization, the magnetism for rotating a rotor is also variable. Thus, using a constant pulse width irrespective of the initial phase energization either N or N+1, might cause unevenness of the follow-up characteristic of the rotor.

SUMMARY OF THE INVENTION

An object of the present invention is to provide a controller for improving the follow-up characteristic of the rotor in driving the stepper motor.

A further object of the invention is to provide a controller for alternate N phase and N+1 phase energization of a stepper motor. A controller constructed in accordance with the present invention for alternately energizing an N number of phases and an N+1 number of phases of a stepper motor comprises a detector for detecting which phase is energized at a time when the stepper motor is paused, and control apparatus for setting a starting pulse width for N phase energization which is shorter than that of N+1 phase energization in response to the detected results from the detector. When the initial energization in starting is N+1 phase, the driving pulse width which is longer than that for N phase is outputted. The N+1 phase energization has stronger magnetism for rotating a rotor than N phase energization, resulting in increased initial rotational speed. When the initial energization is N phase, the driving pulse width which is shorter than that for N+1 phase is outputted. Then, by executing N+1 phase energization following N phase energization, the magnetism is made stronger so that the starting rotational speed is increased. The period for executing N phase energization is made shorter than N+1 phase energization, and the ratio of periods for energizing N phase and N+1 phase is kept constant. By shortening the period for N phase energization and extending the period for N+1 phase energization, smooth and constant rotation is obtained.

BRIEF DESCRIPTION OF DRAWINGS

The above objects, features and advantages of the present invention will become more apparent from the description of the invention which follows, taken in conjunction with the accompanying drawings, wherein like reference numerals denote like elements, and wherein:

FIG. 10 is a time chart illustrating the operation of the stepper motor.

FIG. 11 is a time chart illustrating the operation of the stepper motor.

DETAILED DESCRIPTION OF PREFERRED EMBODIMENT

The stepper motor controller of the present invention will be described with reference to the first embodiment as shown in drawings.

Figure 1:
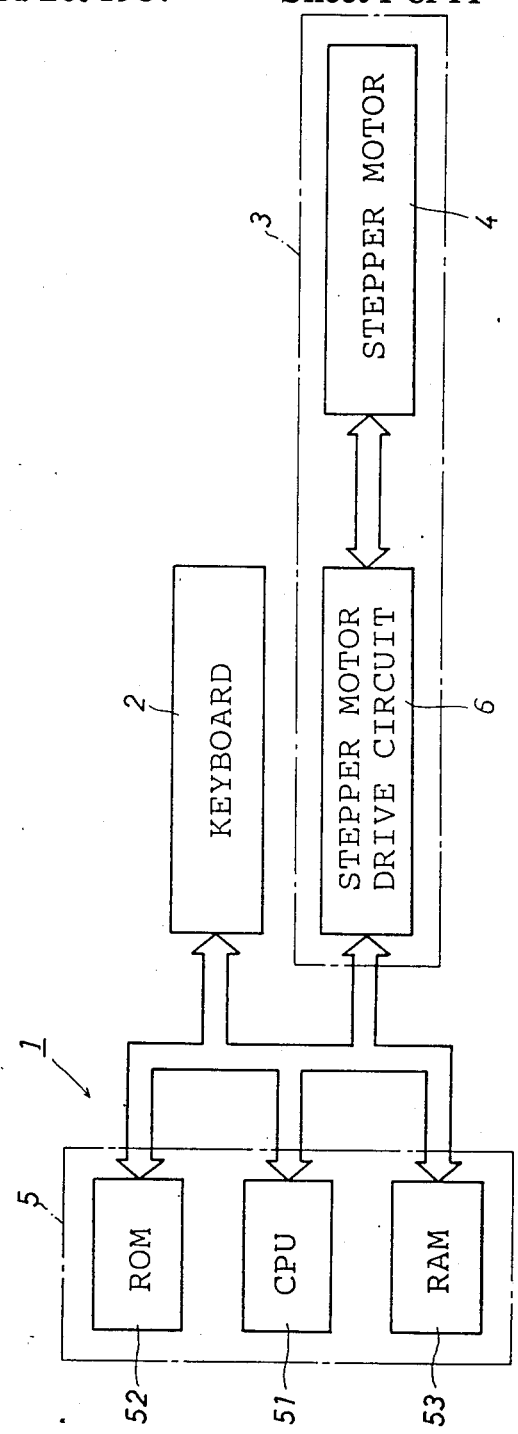
FIG. 1 is a block diagram showing a device for inputting and outputting.
Figure 2:
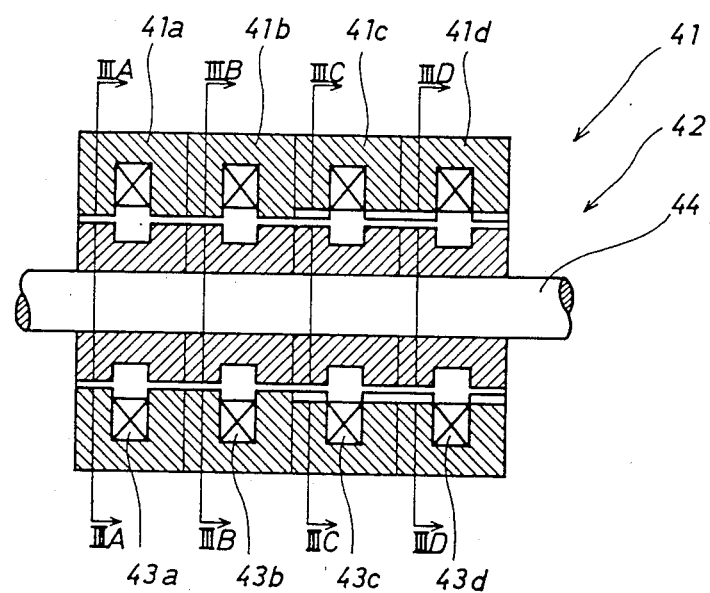
FIG. 2 is a sectional view illustrating a stator and a rotor of a stepper motor.

FIG. 1 shows a block diagram of a device for inputting and outputting. Using the device 1 for inputting and outputting, i.e., a typewriter, the program data or any other information to be executed are inputted via an inputting device 2, i.e., a keyboard, then, outputted as characters or diagrams which can be identified by humans via various kinds of outputting device 3. The present embodiment applies to a printer as the outputting device 3 for printing on a printed media, i.e., a printing sheet. Various type elements such as a type wheel, type cylinder, type ball, type drum of the line printer of drum type, and type band of the line printer of bar type, a carriage, and the feed mechanism for the printed media, i.e., a platen, is to be fed by predetermined lines via a stepper motor 4 as a drive source. The stepper motor 4 is a multi variable reluctance type having six teeth placed in its inner periphery as shown in FIG. 2, FIG. 3A and FIG. 3B; a stator 41 sequentially employing four layered iron cores with magnetic coils 41a, 41b, 41c, and 41d, each of which is quarterly shifted in axial direction; and a rotor 42 rotatably mounted in the stator 41, having six teeth on its outer periphery. By energizing each coil of the stepper motor, i.e., the coils 43a, 43b, 43c, and 43d for one-two phase energization, forty eight paused positions can be obtained. In the inner periphery of the rotor 42, a drive shaft 44 for rotatably holding the rotor 42 and transmitting the power of the rotor 42 to the outside of the stepper motor 4 is provided. The stepper motor 4 for amplifying the output pulse from an Electronic Control Unit 5 (hereinafter referred to ECU) includes a stepper motor drive circuit 6 for respectively energizing the four magnetic coils 43a, 43b, 43c, and 43d in the stepper motor 4.

The ECU 5 processes the inputted data from the keyboard 2 and generates outputs corresponding to the inputted data. The ECU 5 comprises Central Processing Unit 51 (hereinafter referred to CPU), Read Only Memory 52 (hereinafter referred to ROM) for driving at least the stepper motor 4 and Random Access Memory 53 (hereinafter referred to RAM) for storing the step number of the stepper motor 4 which is at least corresponding to the predetermined condition.

Figure 4:
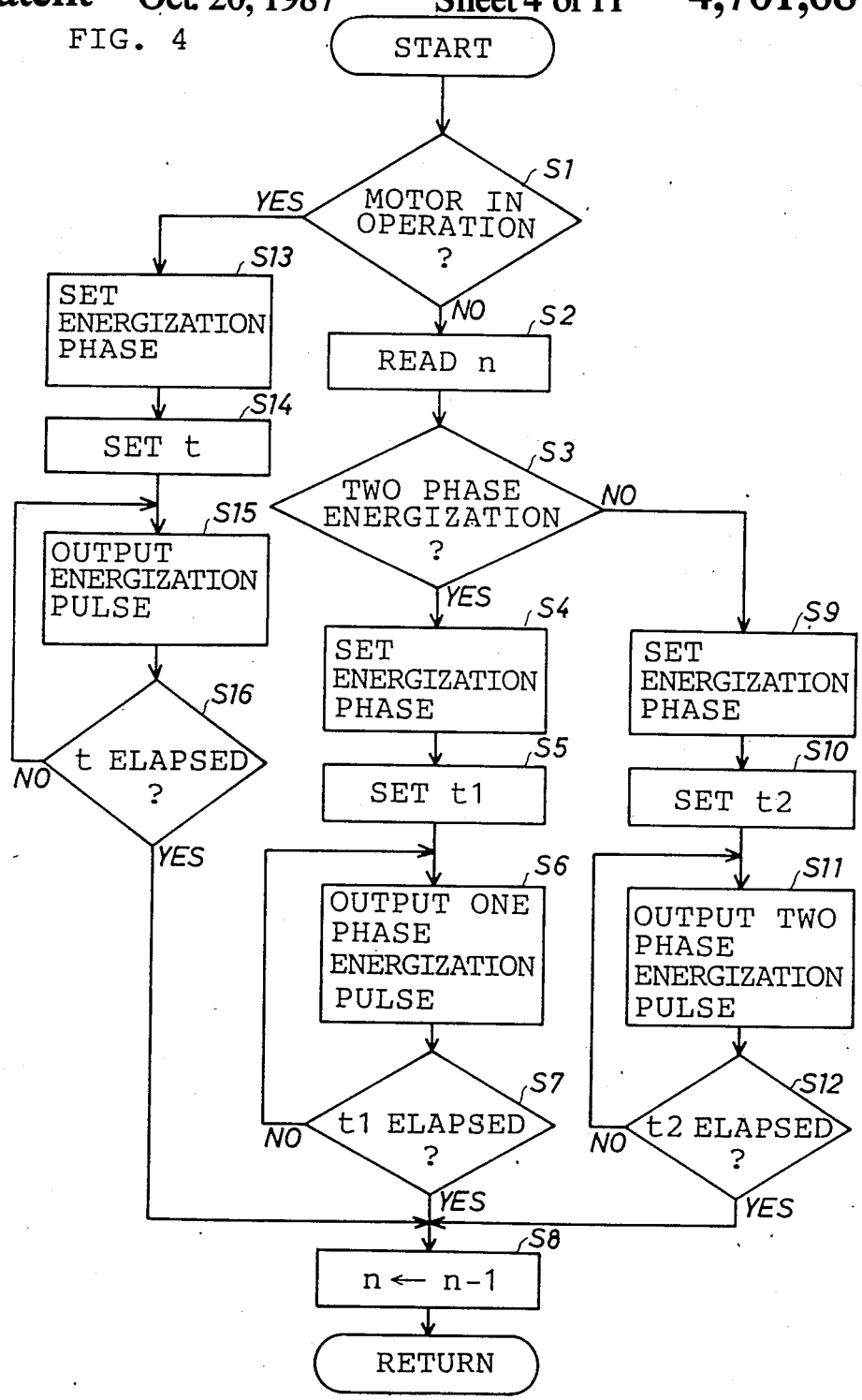
FIG. 4 is a flow chart showing a program for driving and executing drive control of the stepper motor.

The drive control of the stepper motor 4 will be described with reference to the flow chart in FIG. 4.

A program starts at step S1 where a determination is made as to whether the stepper motor 4 is in operation. If the stepper motor 4 is paused, i.e., the determination is NO, a changing step number n is read at step S2 in response to the command for driving the stepper motor 4. The program proceeds to step S3 where it is determined whether the stepper motor is currently paused with two phase energization. If the determination is YES, the program proceeds to step S4 where one phase is to be energized, i.e., with two phase energization before starting, the coils 43a and 43b, and 43b and 43c, 43c and 43d, or 43a and 43d are set for energization, then, the coils 43b, 43c, 43d, and 43a respectively, are set for one phase energization. The program proceeds to step S5 where a settable period t1 for determining the starting pulse width for one phase energization is set. The settable period t1 is made shorter than a settable period t2 for determining the starting pulse width for two phase energization as will described hereinafter. Since the torque for two phase energization is much greater than that for one phase energization, the period t1 requires less torque for driving the rotor 42 than the period t2. At step S6, a one phase energization pulse is outputted to the phase which was set at the step S4. The program further proceeds to step S7 where it is determined whether the period t1 has elapsed. If the determination is NO, the program returns to the step S6. If the determination is YES, the changing step number n−1 is updated as n and the program returns to the start.

If the determination at the step S3 is NO, i.e., the stepper motor is paused with one phase energization, the program proceeds to step S9 where two phase energization is set. For example, in the case of one phase energization before starting, the coil 43a, 43b, 43c, or 43d is set for energization, then, the coils 43a and 43b, 43b and 43c, 43c and 43d, and 43a and 43d, respectively, are set for two phase energization. The program proceeds to step S10 where the settable period t2 for determining the starting pulse width for two phase energization is set. Then, at step S11, a two phase energization pulse is outputted to the phase which is set at the step S9. The program proceeds to step S12 where it is determined whether the period t2 has elapsed. If the determination is NO, the program returns to the step S11. If the determination is YES, the program proceeds to step S8. In case the determination at the step S1 is YES, i.e., the stepper motor is in operation, the program proceeds to step S13 where the phase to be successively energized is set. The program proceeds to step S14 where the settable period t for determining the pulse width of the phase which is set at the step S13 is to be set. At step S15, the phase set at the step S13 is energized with an outputted pulse. The program proceeds to step S16 where a determination is made as to whether the period t has elapsed. If the determination is NO, the program returns to the step S15. If the determination is YES, the program proceeds to step S8.

The driving operation for the above configured stepper motor 4 is described hereinafter.

(A1) Stepper motor paused with two phase energization

Figure 5:
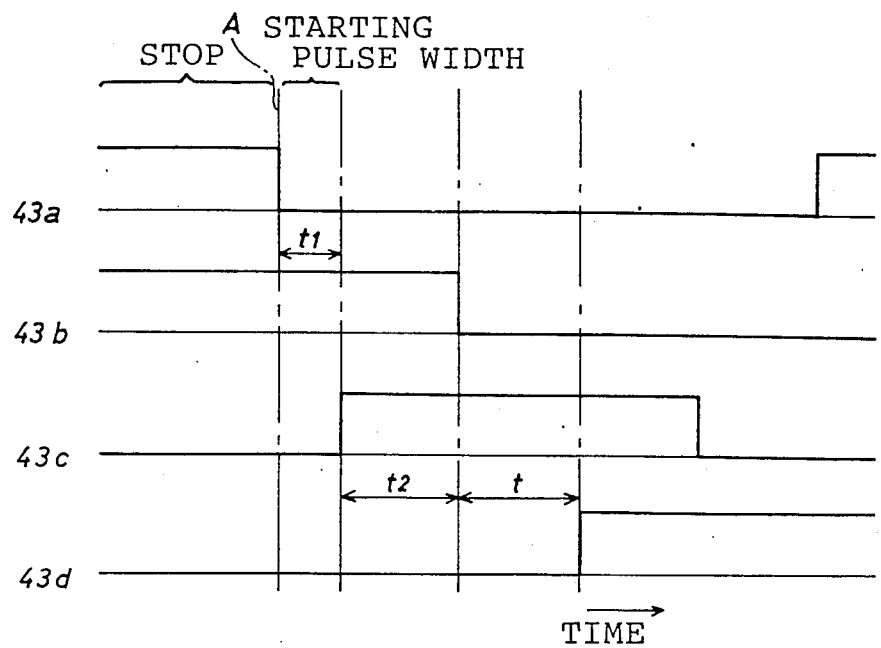
FIG. 5 is a time chart explaining the driving operation following two phase energization.

In the condition, as shown in FIG. 5, when the rotor 42 is paused with two phase energization of the coils 43a and 43b, the coil 43a is deenergized. The coil 43b is energized to provide one phase energization during the settable period t1 in response to the starting command which is given to the stepper motor 4 at the time shown by the broken line A in FIG. 5, thereby starting to move the rotor 42. After the set period t1 has elapsed, the coil 43c is energized along with the coil 43b to provide two phase energization during the set period t2, which doubles the energization current to increase the starting speed of the rotor 42 because of high drive torque. Afterward, one phase energization and two phase energization are alternately performed for driving the stepper motor 4.

(B1) Stepper motor paused with one phase energization.

Figure 6:
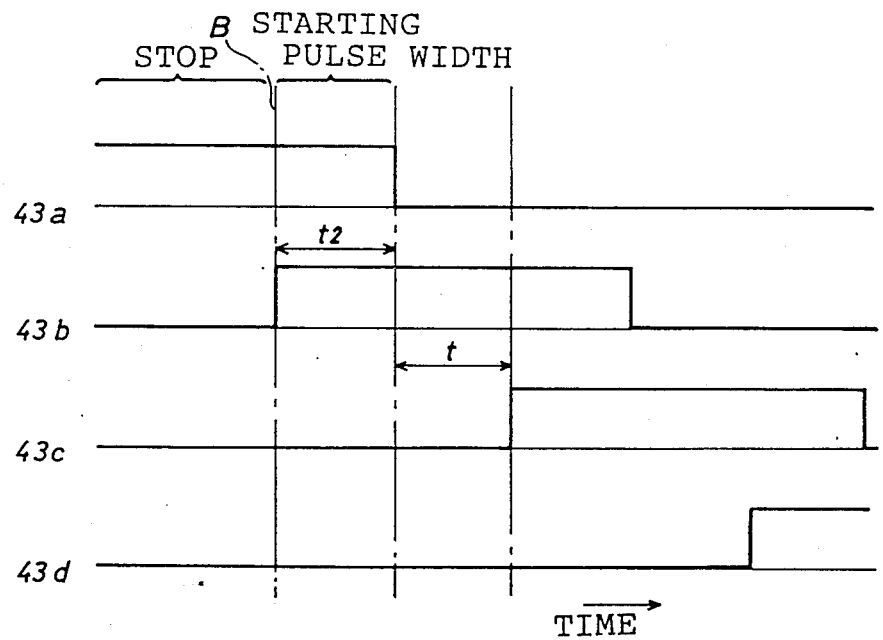
FIG. 6 is a time chart explaining the driving operation following one phase energization.

As shown in FIG. 6, in the condition when the rotor 42 is paused with one phase energization of the coil 43a, the coil 43b is also energized along with the coil 43a in response to the command for driving the stepper motor 4 at the time shown by the broken line B. Then, two phase energization is performed during the preset period t2. Since two phase energization is performed with high torque for driving the rotor 42, it takes more time for execution than one phase energization, thereby increasing the startng rotational speed of the rotor 42. Afterward, one phase energization and two phase energization are alternately performed for driving the stepper motor 4, as described above.

The above embodiment describes the application of the invention to a stepper motor of the multi-stack variable reluctance type. However, any other types such as a synchronous inductor type, permanent magnetic type, or hybrid magnetizing motor are suitable. The present invention is not limited by the above embodiment, but may be applied to various types of stepper motors.

Since the present invention is capable of uniformly increasing the starting speed of a rotor irrespective of either N or N+1 phase energization, the follow-up characteristic of the rotor in driving the stepper motor can be improved.

Figure 3:
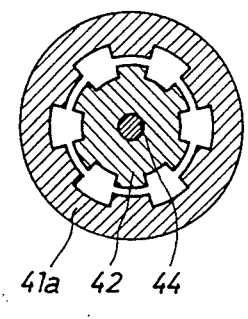
FIG. 3A is a sectional view corresponding to a line along IIIA—IIIA in FIG. 2.
FIG. 3B is a sectional view corresponding to a line along IIIB—IIIB in FIG. 2.
FIG. 3C is a sectional view corresponding to a line along IIIC—IIIC in FIG. 2.
FIG. 3D is a sectional view corresponding to a line along IIID—IIID in FIG. 2.
Figure 3:
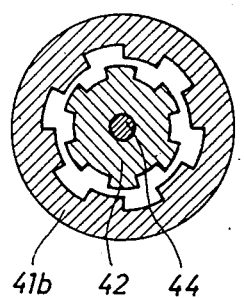
Figure 3:
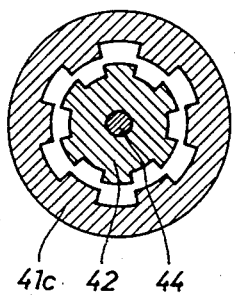
Figure 3:
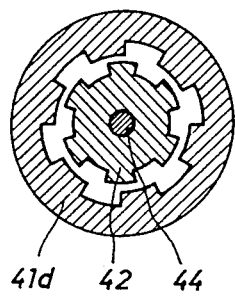

The second embodiment of the present invention will be described. Since the construction of the second embodiment is similar to the first embodiment, FIGS. 1 thru 3 are the same as those of the second embodiment.

Figure 7:
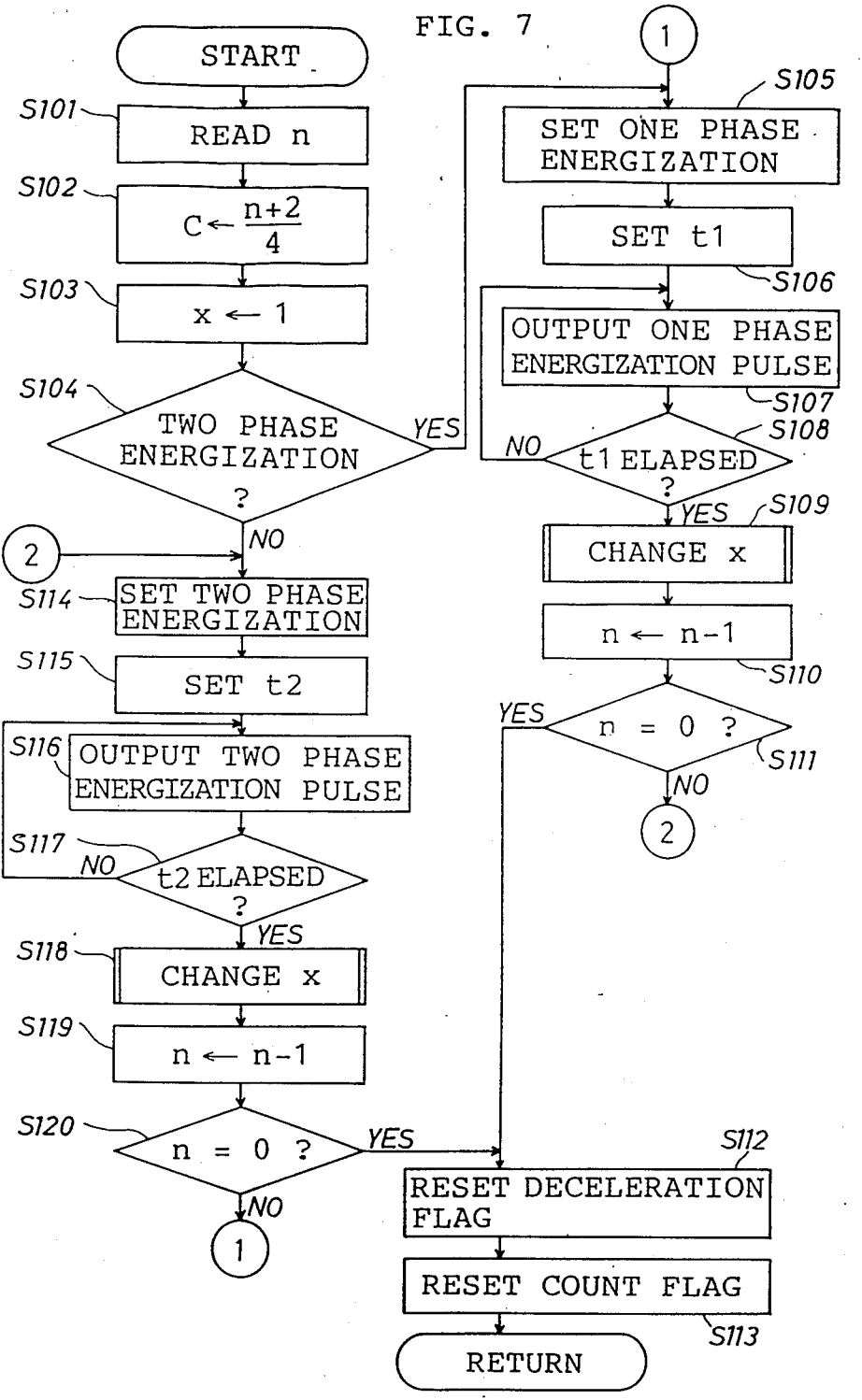
FIG. 7 is a flow chart showing execution for drive control of the stepper motor.

Referring to a flow chart in FIG. 7, the execution for drive control of the stepper motor 4 will be described.

Figure 8:
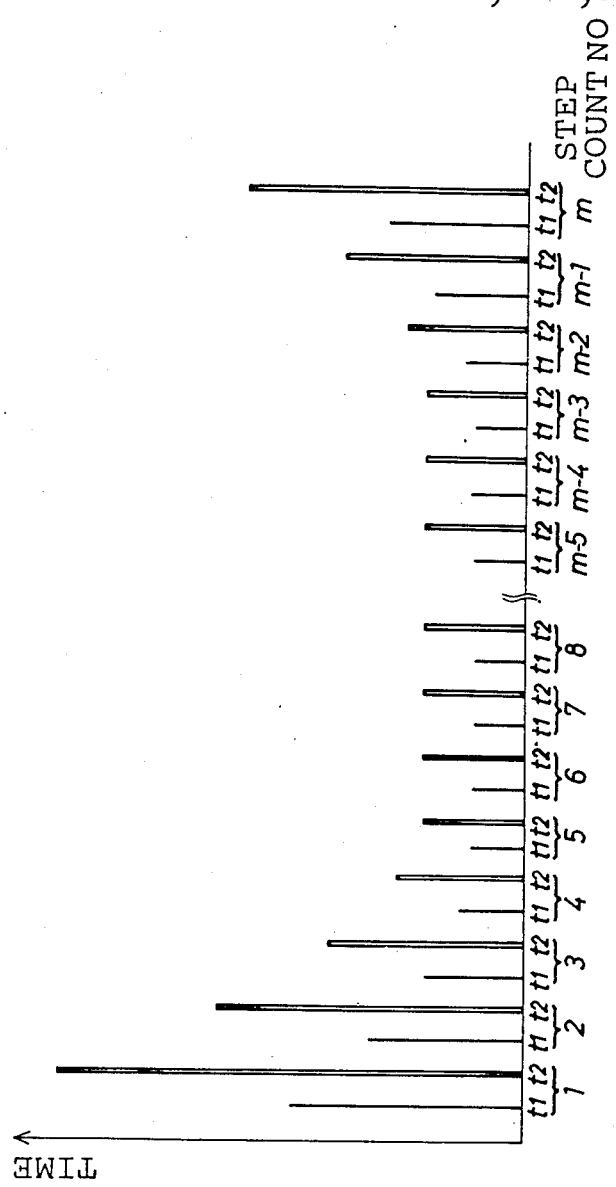
FIG. 8 is a table for setting the set period in accordance with each step count number.

At step S101, a changing half step number n is read in response to the command for driving the stepper motor 4, where n stands for the number of a half step for moving a rotor 42 from its original position. The rotor 42 is rotated at the ratio of n/48 through the movement of n half steps. The program proceeds to step S102 where a value of (n+2)/4 is set as a deceleration command value C for determining whether the deceleration command is given to the stepper motor 4. The program proceeds to step S103 where a step count number x is to be 1 as the initial value, where x stands for a number of the step for moving the rotor 42. Two half steps are counted to be one step. The program proceeds to step S104 where a determination is made whether the stepper motor is currently with two phase energization. If the determination is YES, one phase to be successively energized is set at step S105. For example, in the case of two phase energization of, for example, the coils 43a and 43b, 43b and 43c, 43c and 43d, or 43a and 43d, then, one of the coils 43b, 43c, 43d, and 43a is to be energized, respectively. The program proceeds to step S106 where a set period t1 has been previously set in response to the step count number x for determining the period for one phase energization. The set period t2, as will be explained hereinafter, is also set along with the set period t1, as shown in FIG. 8. The set period t1 is made shorter than the set period t2 since one phase energization requires less torque for driving the rotor 42 than two phase energization. The program proceeds to step S107 where the phase which was set at the step S105 is energized, then the program proceeds to step S108 where a determination is made whether the set period t1 has elapsed. If the determination is NO, the program returns to the step S107. If the determination at the step S108 is YES, the step count number x is changed at step S109. The program proceeds to step S110 where the changing half step number n−1 is updated as n. At step S111, it is determined whether the moving half step number n is zero. If the determination is YES, the program proceeds to step S112. In case a deceleration flag indicating the command for decelerating the stepper motor 4 is set, it is reset and the program proceeds to step S113. At step S113, a count flag for commanding counting of the step count number which is currently set is reset each time when the stepper motor 4 is advanced by a half step. If the determination at the step S104 or S111 is NO, the program proceeds to step S114 where two phase energization is set. For example, if the current one phase energization is with the coil 43a, 43b, 43c, or 43d, two phase energization with, respectively, the coils 43a and 43b, 43b and 43c, and 43a and 43d are set. At step S115, a set period t2 for determining the period for executing two phase energization responsive to the step count number x is set as to keep the ratio of the set period t1 to the set period t2 constant. The program proceeds to step S116 where the phases which are set at the step S114 are energized, then the program proceeds to step S117 where it is determined whether to set period t2 has elapsed. If the determination is NO, the program returns to the step S116. If the determination is YES, the program proceeds to step S118 where the step count number x is changed in the same manner as at step S109. At step S119, the changing half step number n−1 is updated as n. The program proceeds to step S120 where a determination is made whether the changing half step number n is zero. If the determination is NO, the program proceeds to step S105. If the determination is YES, the program proceeds to the step S112.

Figure 9:
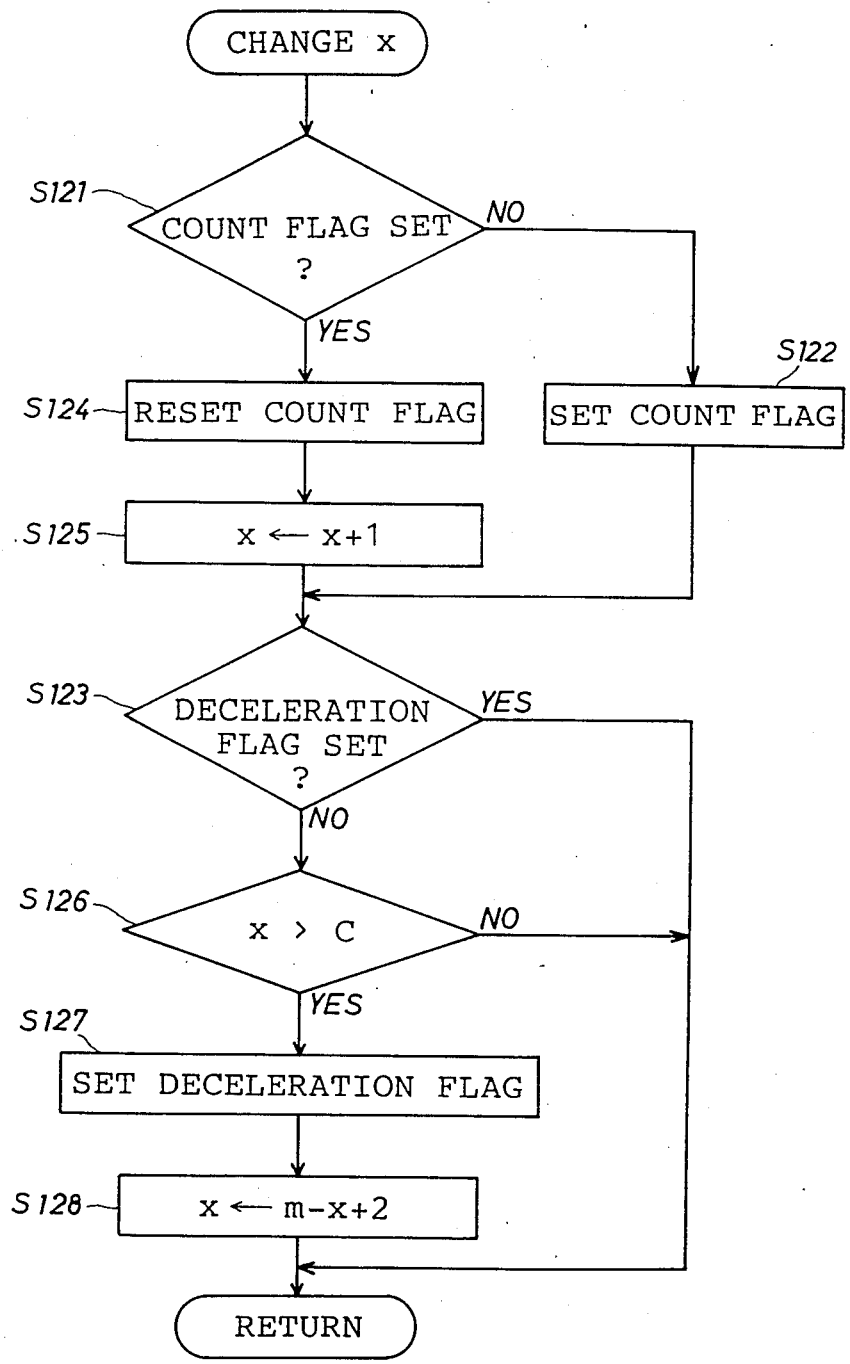
FIG. 9 is a flow chart showing sub-program of FIG. 7 for changing step count number.

FIG. 9 shows a sub-program for changing the step count number x executed at the steps S109 and S118.

The program starts at step S121 where it is determined whether a count flag is set. If the determination is NO, the program proceeds to step S122 where the count flag is set and the program proceeds to step S123. If the determination is YES, the program proceeds to step S124 where the count flag is reset and the program proceeds to step S125. At the step S125, a step count number x+1 is updated as x. Then, the program proceeds to step S123 where it is determined whether the deceleration flag is set. If the determination is YES, the program returns. If the determination is NO, the program proceeds to step S126 where it is determined whether the step count number x is above the decelerating command value C. If the determination is NO, the program returns. If the determination is YES, the program proceeds to step S127 where the deceleration flag is set. The program proceeds to step S128 where the step count number x is updated using the equation of m−x+2, where m stands for a maximum step number and x stands for a current step number, then, the program returns.

The operation of the stepper motor 4 with the above-configured control unit will be described.

(A2) Stepper motor paused with two phase energization (a) acceleration

In the condition when the rotor 42 is paused with two phase energization of the coils 43a and 43d, as shown in FIG. 10, the coil 43d is deenergized. In response to the command for driving stepper motor 4 during the period commencing at the time shown by broken line A in the Figure, the coil 43a is energized during the settable period t1 with the step count number 1 as shown in FIG. 8, so as to start rotating the rotor 42. After the set period t1 has elapsed, the coil 43b, along with 43a, is energized during the set period t2 with the step count number equal to 1 so as to double the energization current for performing two phase energization with high drive torque. After the set period t2 has elapsed, only the coil 43b is energized during the set period t1 with the step count number equal to 2. Then, the coils 43b and 43c are energized for two phase energization during the set period t2 with the step count number equal to 2. The more the step count number is increased, the shorter the settable periods t1 and t2 are made, thereby rotating the rotor 42 in high speed with acceleration.

The settable period t1 for each step count number is made shorter than the set period t2 determined in accordance with the set period t1 during acceleration. Since two phase energization takes more time than one phase energization with weak magnetism, the rotor 42 can be rapidly and accurately rotated with high speed.

(b) normal speed

The above accelerated stepper motor 4 is rotated with normal speed, repeating one phase and two phase energization during the period defined by broken lines B and C in FIG. 10, because, as shown in FIG. 8, the settable periods t1 and t2 within the range of the step counter number from 5 to m−3 are respectively the same time.

The settable period t1 is made shorter than the settable period t2. Since two phase energization with strong magnetism takes more time than one phase energization with weak magnetism, the rotor 42 can be smoothly rotated with high torque.

(c) deceleration

When the step count number x is greater than the deceleration command value C, it is obtained by the following equation.

$$x = (\text{maximum step number m}) - (\text{current step count number x}) + 2$$

In the condition when the step count number x is greater than m−2, one phase energization is performed during a settable period t1 which is made longer than the settable period t1 with the step count number ranging from 5 to m−3. Then, two phase energization is performed during the settable period t2 with the step count number equal to m−2. Next, one phase energization and two phase energization are respectively performed during the periods t1 and t2 with the step count number equal to m−1. Then, one phase energization and two phase energization are respectively performed during the settable periods t1 and t2 with the step count number equal to m. When the step count number is greater than m−2, the settable periods t1 and t2 are lengthened in accordance with the step count number n, which in increased to decelerate the rotation speed of the rotor 42. The rotor 42 is stopped, keeping the current energization at a time when the changing half step number is zero. Two phase energization with strong magnetism takes a longer time than one phase energization, and thus high speed rotation of the rotor 42 can be decelerated rapidly and accurately.

(B2) Stepper motor paused with one phase energization (d) acceleration

In the condition when the rotor 42 is paused with one phase energization of the coil 43a, coil 43b is also energized for performing two phase energization during the settable period t2 with the step count number equal to 1 in response to the command for driving the stepper motor 4 at the time shown by the broken line D. After the settable period t2 elapses, only one phase, coil 43b, is energized during the settable period t1 with the step count number equal to 1. Then, two phases, the coils 43b and 43c, are energized during the settable period t2 with the step count number equal to 2, then, only one phase, the coil 43c, is energized during the settable period t1 with the step count number equal to 2. In this manner, the more the step count number is increased, the shorter the settable periods t1 and t2 are made, thereby accelerating the rotation speed of the rotor 42.

(e) Normal speed

The above accelerated stepper motor 4 is rotated with normal speed, repeating one phase energization and two phase energization during the period defined by broken lines E and F in FIG. 11. Similarly to the normal speed condition described above under subheading (A2) (b), the settable periods t1 and t2 within the range of the step count number from 5 to m−3 are respectively the same period for each energization.

(f) deceleration

In the condition when the step count number x is greater than m−2, as shown in FIG. 11, the rotor 42 is decelerated by the repetition of one phase and two phase energization, since the settable periods t2 and t1 are gradually made longer. The rotor 42 stops, keeping the current energization at a time when the changing half step number becomes zero.

Figure 12:
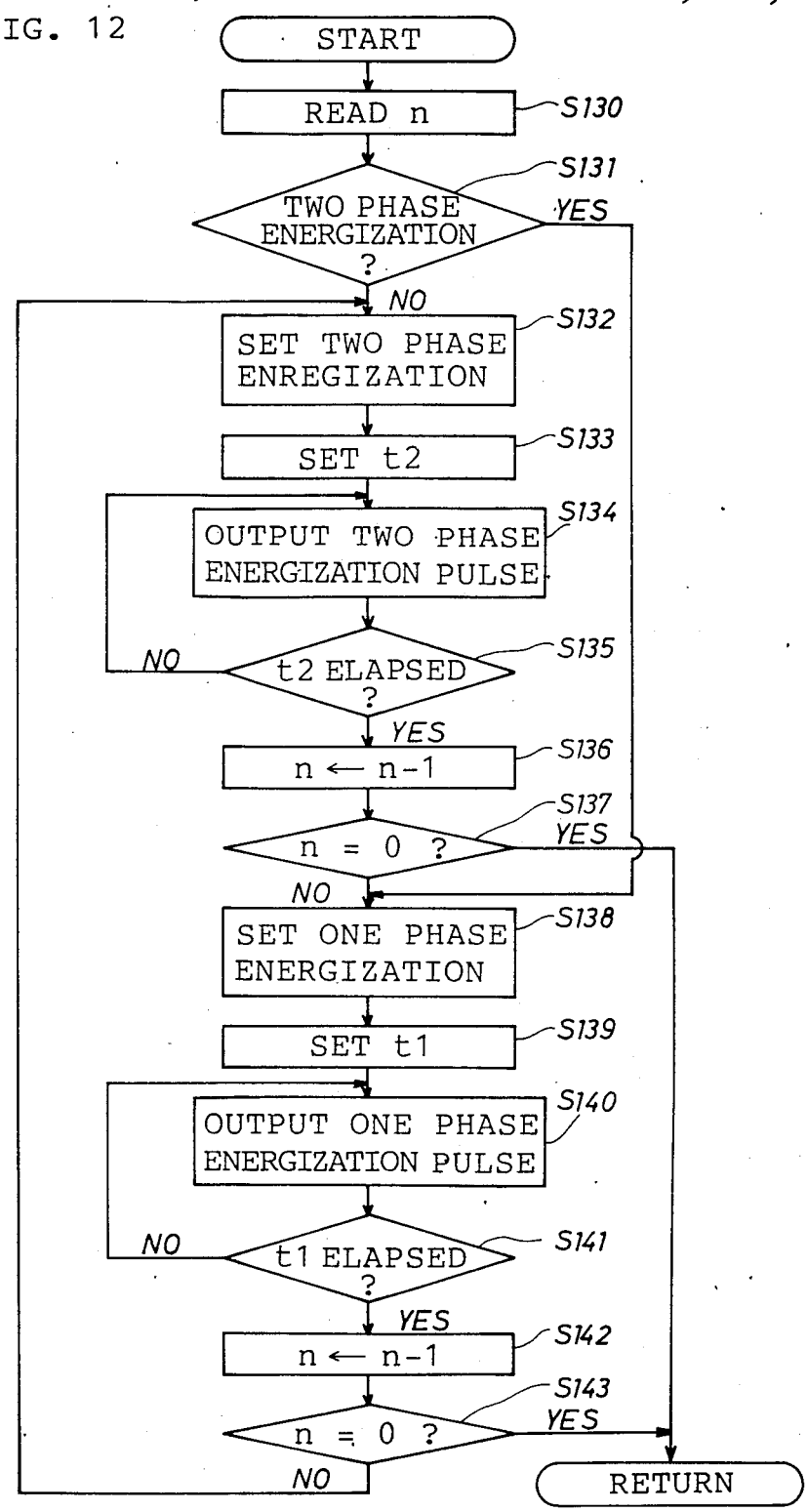
FIG. 12 is a flow chart showing another embodiment of the drive control for the stepper motor.

FIG. 12 is a flow chart showing another embodiment of the present invention. The program starts at step S130 where the changing half step number n is read in response to the command for driving the stepper motor 4. The program proceeds to step S131 for determining whether the stepper motor 4 is currently with two phase energization. If the above determination is NO, the program proceeds to step S132 where two phase energization is set. Then, at step S133, the settable period t2 for two phase energization is set, and at step S134, the phases which are set at the step S132 are energized. The program proceeds to step S135 where it is determined whether the settable period t2 has elapsed. If the above determination is NO, the program returns to the step S134. In the case of a YES determination, the program proceeds to step S136 where the changing step number n−1 is updated as n. The program further proceeds to step S137 where it is determined whether the changing half step number n is zero. If the determination is YES, the program returns. If the determination of the step S131 is YES, or the step S137 determination is NO, the program in both cases proceeds to step S138 where one phase energization is set. The program proceeds to step S139 where the settable period t1 is determined for one phase energization. At step S140, the phase which is set at the step S138 is energized, and at step S141, it is determined whether the settable period t1 has elapsed. If the determination is NO, the program returns to the step S140. In the case of a YES determination, the program proceeds to step S142 where the changing half step number n−1 is updated as n. Then, the program proceeds to step S143 where it is determined whether the changing half step number n is zero. If the determination is NO, the program proceeds to step S132. In the case of a YES determination, the program returns.

The operation of the stepper motor 4 driven the aboveconfigured controller will be described.

Figure 13:
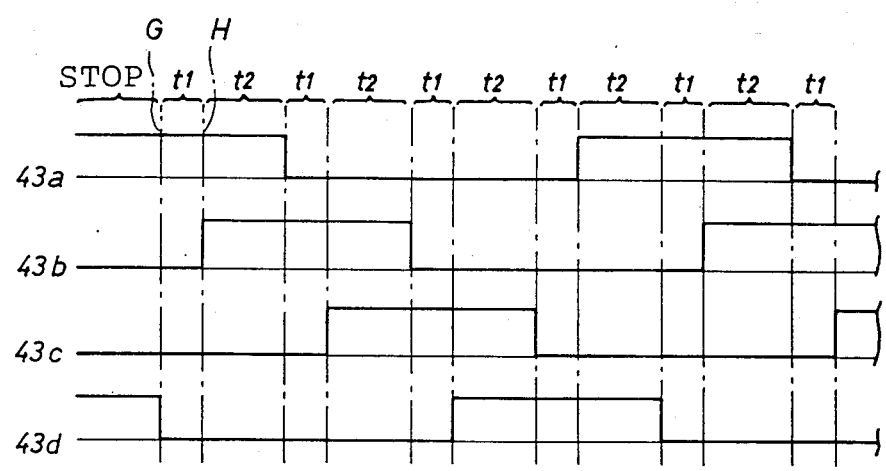
FIG. 13 is a time chart showing the operation of the another embodiment.

When the rotor 42 is paused with two phase energization of the coils 43a and 43d, as shown in FIG. 13, only coil 43a is energized for one phase energization during the settable period t1 responsive to the starting command for driving the stepper motor 4 at the time shown by broken line G. After the period t1 elapses, the coil 43b is energized along with coil 43a for performing two phase energization during the period t2. When the rotor 42 is paused with one phase energization of the coil 43a, the coils 43a and 43b are energized for two phase energization during the period t2 responsive to the command for driving the stepper motor 4 at the time shown by broken line H. After the period t2 has elapsed, only the coil 43b is energized for one phase energization during the period t1. Thus, two phase energization and one phase energization are alternately performed. Since neither the settable periods t1 nor t2 are varied, the rotor 42 is driven with constant rotation speed to be stopped keeping the current energization, at a time when the changing half step number becomes zero.

The above embodiment applies to a stepper motor of the multi-stack variable reluctance type. However, any other types of stepper motor such as synchronous inductor, permanent magnet, or hybrid permanent magnet may be used.

The present embodiments describe controllers for controlling a stepper motor which rotates in a single direction. However, the present invention may be applied for controlling a stepper motor which rotates in either direction.

The present invention is not limited to the above embodiments. Rather it is applicable for controlling almost all types of stepper motors.

The present invention can improve the follow up characteristic of a stepper motor to smoothly rotate a rotor by making the one phase energization period with weak magnetism shorter than that for two phase energization, and by making constant the ratio of the periods for one phase energization and two phase energization.

While preferred embodiments of the invention have been described, it is to be understood that the invention is not limited thereto, and may be otherwise embodied within the scope of the following claims.

What is claimed is:

1. An N phase/N+1 phase energization type controller for alternately energizing an N number of phases and an N+1 number of phases of a stepper motor having a rotor and a stator, N being an integer equal to or larger than 1, said controller comprising:
   output means for providing a determination pulse having a preset time period during which said rotor is in a pause position;
   memory means responsive to said output means for detecting and storing a signal indicative of the energization phase condition existing at the time of said determination pulse;
   control means responsive to said memory means for controlling a time period of a first pulse for N phase energization so as to be shorter than a time period of a second pulse for N+1 phase energization if said stepper motor starts on said first pulse.

2. A controller as claimed in claim 1 wherein said second pulse is generated after generation of said first pulse.

3. A controller as claimed in claim 2 wherein said control means controls the periods for N and N+1 phase energization to preset values after generation of said second pulse.

4. A controller as claimed in claim 1 wherein said control means controls the periods for N and N+1 phase energization to preset values if the stepper motor starts on said second pulse.

5. An N phase/N+1 phase energization type controller for alternately energizing an N number of phases and an N+1 number of phases of a stepper motor having a rotor and a stator, N being an integer equal to or greater than 1, said controller comprising:
   control means for controlling a time period of a first pulse for N phase energization to be shorter than a time period of a second pulse for N+1 phase energization, and for maintaining approximately constant a ratio of said time periods of said first and second pulses, said control means determining said periods of said first and second energization pulses in response to a step count number.

6. A controller as claimed in claim 5 wherein said control means controls said periods of said first and second energization pulses such that said periods become progressively shorter during acceleration of said rotor.

7. A controller as claimed in claim 5 wherein said control means controls said periods of said first and second energization pulses such that said periods become progressively longer during deceleration of said rotor.

8. A controller as claimed in claim 5 wherein said control means decelerates said rotor in response to a deceleration flag.

9. A controller for energization of a stepper motor as claimed in claim 5 wherein said control means maintains constant said periods of said first and second energizing pulses when driving said rotor with normal speed.

10. A controller as claimed in claim 5 wherein said stepper motor is a one-two phase energization type for alternately energizing one phase and two phases.

* * * * *